United States Patent

[11] 3,624,051

[72] Inventors Johann Bauer;
 Gerhard Beier; Joseph Heckmaier, all of
 Burghausen-Upper Bavaria, Germany
[21] Appl. No. 754,975
[22] Filed Aug. 23, 1968
[45] Patented Nov. 30, 1971
[73] Assignee Wacker-Chemie G.m.b.H.
 Munich, Germany
[32] Priority Aug. 28, 1967
[33] Germany
[31] W 44668

[54] PROCESS FOR POLYMERIZING AND
 COPOLYMERIZING VINYL CHLORIDE IN
 AQUEOUS EMULSIONS
 4 Claims, No Drawings

[52] U.S. Cl. .................................................. 260/78.5,
 260/80.81, 260/86.3, 260/87.1, 260/87.5,
 260/87.7, 260/92.8 W
[51] Int. Cl. ................................................. C08f 3/30,
 C08f 1/13
[50] Field of Search............................................ 260/92.8
 W, 29.6 TA

[56] References Cited
 UNITED STATES PATENTS
2,771,457 11/1956 Barnes et al. .................. 260/92.8 W 3,342,765 9/1967 Oosterhof et al. ............ 260/23
 OTHER REFERENCES
 Smith, M. W., Vinyl Resins. Reinhold Plastics Application Series, Reinhold Publishing Corporation, N.Y. 1958 p. 96– 98

Primary Examiner—Joseph L. Schofer
Assistant Examiner—J. A. Donahue, Jr.
Attorney—Donald Malcolm ABSTRACT: This invention relates to a process for making pastable polymerizates of vinyl chloride or of pastable copolymerizates containing at least 80 weight percent polyvinyl chloride, by polymerizing or copolymerizing vinyl chloride in aqueous emulsion, that is by polymerization or copolymerization of vinyl chloride which is dispersed in water by means of emulsifiers. The process is performed in the presence of water-soluble salts of aliphatic branched saturated monocarboxylic acids containing —$CH_2$— groups in the alpha position to the carboxyl groups, with at least 8 carbon atoms per molecule, as emulsifiers.
The term "pastable" polymerizates or copolymerizates" means that the polymerizates or copolymerizates can be dispersed in the known manner in plasticizers, if desired by also using organic thinners which dissolve or swell the polymerizates or copolymerizates not at all or only a little, during the formation of pastes or plastisols or organosols.

3,624,051

PROCESS FOR POLYMERIZING AND COPOLYMERIZING VINYL CHLORIDE IN AQUEOUS EMULSIONS

CROSS-REFERENCE TO RELATED APPLICATION

The process of this application is a modification of that disclosed and claimed in our copending application Ser. No. 651,666, filed July 7, 1967.

BACKGROUND OF THE INVENTION

One known polymerization process of the kind referred to above uses as emulsifiers, water-soluble salts of aliphatic saturated monocarboxylic acids which are branched in alpha-position to the carboxyl group which contains a minimum of eight carbon atoms per molecule. Although the polymerizates obtained by this known method have a better thermal stability than polymerizates made with many other emulsifiers, they yield pastes which have an unsatisfactorily high viscosity and a dilating flow, i.e. their viscosity increases as the effect of shearing forces increases.

It is also known how to polymerize or copolymerize vinyl chloride in aqueous emulsion, using a polymerizate seed latex. During such polymerization process, according to the prevailing opinion of experts, it was essential to see to it that at any time during the polymerization no free emulsifier should be present, i.e. not more of the emulsifier is present that is necessary to completely cover the surface of the available polymerizate particles with a monomolecular layer. It has been found that the use of these known methods for polymerizing vinyl chloride in aqueous emulsion, using a polymerizate seed latex while using salts of branched carboxylic acids as emulsifiers results in an undesirable coagulation of the polymerizate dispersion during or immediately after the polymerization.

SUMMARY OF THE INVENTION

The present invention provides a process for the polymerization and copolymerization of vinyl chloride, which not only avoids the above-mentioned undesirable coagulation, but further yields polymerizates which are thermally very stable or which can easily be thermally stabilized. The polymerizates prepared in accordance with our invention result in pastes which have a low viscosity compared to their content of solid substances have good storage properties and low transfer of plasticizers to absorptive bases, which is particularly important when coating ribbons of woven and unwoven fibers with plastisols; and they also display a Newtonian or largely Newtonian flow property to pseudo-plastic flow properties which are very desirable for their processing. i.e their viscosity decreases under the influence of shearing forces or it is thereby influenced either not at all or very little. Moreover, the emulsifiers used according to the invention, compared to the previously used water-soluble salts of aliphatic monocarboxylic acids branched in alpha position to the carboxyl group, with 15 to 19 carbon atoms per molecule, have the advantage that the carboxylic acids used for their manufacture are more easily obtainable in uniform quality with respect to the polymerizates made in the presence of the salts made from these acids.

The object of the invention is a modification of the method of polymerizing and copolymerizing vinyl chloride using a polymerizate seed latex in the presence of water-soluble aliphatic saturated monocarboxylic acids branched in alpha position to the carboxyl group with at least eight carbon atoms per molecule, as emulsifiers, where at the beginning of the polymerization of the monomers to be polymerized in the presence of the polymerizate seed latex 0.1 to 1 weight percent, referred to the total weight of the polymerizate available in the polymerizate seed latex, and of the total quantity of the monomer to be polymerized, of emulsifier together with the seed latex are present, as per our application Ser. No. 651,666, filed July 7, 1967, characterized by the fact that instead of the water-soluble salts of aliphatic saturated monocarboxylic acids branched in alpha position to the carboxyl group with at least eight carbon atoms per molecule or in admixture with such salts, we use as emulsifiers water-soluble salts of aliphatic branched saturated monocarboxylic acids containing —$CH_2$—groups in alpha position to the carboxyl group with at least eight carbon atoms per molecule.

The term "monomer to be polymerized" signifies the monomer which is polymerized in the presence of the polymerizate seed latex, or the monomers which are copolymerized in the presence of the polymerizate seed latex.

Compared to the known methods for polymerizing and copolymerizing vinyl chloride in aqueous emulsion using a polymerizate seed latex, or novel process, besides the advantages indicated above, has the further advantage that the chance of dosaging errors for the emulsifier quantities is reduced, which means a lower requirement of personnel and equipment.

DESCRIPTION OF THE PREFERRED EMBODIMENTS

If the process of the invention is used for the copolymerization of vinyl chloride, all monomers can be used which can be copolymerized in the known manner with vinyl chloride. However, the preferred monomers that can be copolymerized with vinyl chloride are those which contain only one polymerizable group, namely the group

Here are some examples: vinylidene chloride, vinyl esters of carboxylic acids like vinyl formate, vinyl acetate, vinyl laurate and vinyl benzoate, acrylic esters and methacrylic esters like methyl acrylate and methyl methacrylate, as well as unsaturated dicarboxylic acids like maleic acid, fumaric acid, methylene malonic acid, itaconic acid, citraconic acid or tetrahydrophthalic acid, and the mono- and di-esters of these acids, like maleic acid dimethyl ester, diethyl ester and-di-n-butyl ester, maleic acid mono- (2-ethylhexyl-) ester, fumaric acid-dimethyl ester, -diethyl ester, -di-n-butyl ester, -di-(2-ethylexyl-) ester and -dilauryl ester. Of course, according to our process one can also make copolymerizates of more than two monomers, for instance copolymerizates of 86 weight percent vinyl chloride, 13 weight percent vinyl acetate and 1 weight percent maleic acid anhydride.

Since vinyl chloride is more readily available than most other monomers, the constituent of monomers to be copolymerized with vinyl chloride preferably does not exceed 20 weight percent, referred to the total weight of vinyl chloride and the monomers to be copolymerized.

All compounds that are useable as catalysts in the polymerization and copolymerization of vinyl chloride in aqueous emulsion can likewise be used in our process most frequently these substances, preferred in our process, are water-soluble substances which yield radicals, particularly peroxide compounds like hydrogen peroxide, persulfates and perborates. Occasionally one can also use monomer-soluble radical components instead of or in conjunction with water-soluble radical components; this is mostly done in redoxy systems. Catalysts which can be used for polymerization or copolymerization of vinyl chloride in aqueous emulsion are well known, and are described, for instance, in Bovey, Kolthoff, Medalia and Meehan "Emulsion Polymerization", New York 1955, pages 59 to 93, The catalysts are preferably used in quantities of 0.01 to 5 weight percent, particularly 0.02 to 1 weight percent, each time referred to the weight quantities of the monomer to be polymerized.

The polymerizate seed latex is preferably used in quantities of 1 to 10 weight percent, preferably 2 to 5 weight percent, each time referred to the weight quantities of the monomer(s) to be polymerized. For producing the polymerizate seed latex the same kind of monomers can be used that are used for the polymerization in the presence of the polymerizate seed latex, and if one uses monomeric mixtures for the polymerization in the presence of polymerizate seed latex, the polymerizate seed latex used at that time can have the same composition with regard to the kind and proportion of the polymer units as the polymerizates manufactured by the use of this latex. The polymerizate seed latex can be made by any desired method for the polymerization and copolymerization of vinyl chloride in aqueous emulsion. For simplicity's sake the preferred emulsifiers used are likewise water-soluble salts of aliphatic, branched saturated monocarboxylic acids containing —$CH_2$— groups in alpha position to the carboxyl group, with at least eight carbon atoms per molecule.

The polymerizate seed latex is introduced or made before the monomers, which are to be polymerized by the use of the polymerizate seed latex, are added into the polymerization vessel.

The monocarboxylic acids from which the anions are derived in the salts which according to the invention are used as emulsifiers, can also be identified as saturated aliphatic, monocarboxylic acids with at least eight carbon atoms per molecule, which contain at least one tertiary and/or quaternary carbon atom per molecule, but where at least 50 percent of the carbon atoms in alpha position to the carboxyl group are secondary carbon atoms. They can be expressed by the general formula

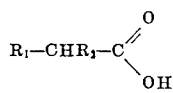

In this formula $R_1$ is a branched alkyl group and $R_2$ is a hydrogen atom or a linear or a branched alkyl group, where at least 50 percent, preferably at least 80 percent of the number of $R_2$ are hydrogen atoms and the sum of the carbon atoms of $R_1$ and an alkyl residue $R_2$ is at least 6. The groups $R_1$ and $R_2$ can be connected to a ring.

Since not all carbon atoms in alpha position to the carboxyl group in the salts used as emulsifiers according the the invention must be secondary carbon atoms, the term "or in mixture with such salts" is used herein to denote this. The term "such salts" which we use refers particularly to those water-soluble salts of aliphatic saturated monocarboxylic acids, branched in alpha position to the carboxyl group, containing at least 8 carbon atoms per molecule, wherein on the carbon atoms in alpha position to the carboxyl group there is also one hydrogen atom. The presence of quantities of water-soluble salts of aliphatic, doubly branched carboxylic acids in alpha position to the carboxyl group, of up to 50 weight percent of water-soluble salts of aliphatic, branched saturated monocarboxylic acids containing —$CH_2$—groups in alpha position to the carboxyl group, with at least eight carbon atoms per molecule — is not excluded.

It is useful for the monocarboxylic acids from which the anions of the salts used as emulsifiers according to the invention, not to contain more than 21 carbon atoms per molecule, preferably they contain 10 to 18 carbon atoms per molecule.

The monocarboxylic acids from which the anions in the salts used as emulsifiers according the the invention are derived, are particularly accessible by the conversion of branched-chained monoolefines with seven to 20 carbon atoms per molecule with carbon monoxide and hydrogen at normal pressure up to 1,500 atmospheres absolute pressure and 50° to 200° C. in the presence of cobalt or cobalt salts, i.e. by so-called oxosynthesis and oxidation of the products obtained during this conversion into monocarboxylic acids. Preferably one uses for branch-chained monoolefines, olefines with a uniform carbon number e.g. purified tri-, tetra-, penta- or hexamers of propylene, so that isomer mixtures of carboxylic acids with uniform numbers of carbon atoms per molecule are formed. Such isomer mixtures are commercially available under the name "Isodecanic acid", "Isotridecanic acid" or "Isooctadecanic acid". The alkyl groups branching off from the principal chain in these carboxylic acids are methyl groups.

By neutralizing the aliphatic saturated monocarboxylic acids containing —$CH_2$— groups which are branched in alpha position to the carboxyl group, and contain at least eight carbon atoms per molecule, for instance with alkali metal hydroxides and/or ammonium hydroxide and/or with organic bases like triethanolamine, these carboxylic acids can be converted into the salts which are used as emulsifiers according to our process. This neutralization can take place in the polymerization vessel before the beginning of the polymerization and during the preparation of the quantity of emulsifier that exceeds the 0.1 to 1 weight percent, referred to the total weight of the polymerizate available in the polymerizate seed latex and of the total quantity of the monomer to be polymerized, during polymerization; but one can also introduce into the polymerization vessel aqueous solutions of the finished salts.

The total quantity of water-soluble salts of aliphatic saturated monocarboxylic acids, containing —$CH_2$— groups branched in alpha position to the carboxyl group, with at least eight carbon atoms per molecule, i.e. the total quantity of these salts which is available at the beginning of the polymerization of the monomer(s) to be polymerized in the presence of polymerizate seed latex, together with the seed latex, and the quantity of these salts which might be introduced during the polymerization into the polymerization vessel or which might be created therein, amounts preferably to 0.1 to 5 weight percent, referred to the total weight of the polymerizate present in the polymerizate seed latex and the total quantity of the monomer to be polymerized.

The weight proportion of the monomer to water is not decisive. Usefully it is in the range of 3:1 to 1:2, preferably in the range of 2:1 to 1:1.5.

The polymerization can take place a temperatures which are customary for processes for polymerizing and copolymerizing vinyl chloride in aqueous emulsion, i.e. within the range of —20° to 100° C., preferably from 25° to 70° C.

The 0.1 to 1 weight percent, referred to the total weight of polymerizate available in the polymerizate seed latex and the total quantity of monomer to be polymerized, of emulsifier which according to the invention is available at the beginning of the polymerization of the monomer(s) to be polymerized in the presence of the polymerizate seed latex together with the polymerizate seed latex, represent a sum of the quantity of emulsifier which is already contained in the seed latex from its creation and a quantity of emulsifier before the beginning of the polymerization of the monomer(s) to be polymerized in the presence of the polymerizate seed latex which was added to the seed latex or produced in the presence of the seed latex. This sum of quantities corresponds to at least about 1,000 weight percent of the quantity necessary to cover the entire surface of the polymerizate seed latex with a monomolecular layer.

Particularaly essential for the process of the invention is the use of the above-mentioned salts of branched carboxylic acids as emulsifiers in connection with the use of a considerable emulsifier excess at the beginning of the polymerization with the known use of polymerizate seed latex during the polymerization and copolymerization of vinyl chloride in aqueous emulsion. Apart from these measures essential to our process one can use all possible measures for polymerizing and copolymerizing vinyl chloride in aqueous emulsion, particularly with regard to temperature, pressure and movement of the polymerization ingredients; if desired, one can also employ customary additives besides the above-mentioned catalysts, like buffer agents and hydrocarbons, as well as regulators, e.g. chlorinated hydrocarbons.

From the polymerizate dispersions obtained according to our process one can produce the polymerizates in the known manner, e.g. by rolling or spray drying. From the polymerizates produced according to the invention, one can make plastisols and organosols in the known manner by grinding up with plasticizers, perhaps by including insoluble or slightly soluble volatile organic thinners which dissolve or swell the polymerizates not at all or only a little. One can include with these the customary additives to plastisols and organosols, like stabilizers, e.g. barium-cadmium soaps, pigments, dyes and fillers.

As plasticizers for the polymerizates made according to the invention one can use all the monomer and polymer compounds which are usually utilized as plasticizers for polyvinyl chloride and its copolymerizates (see H. Gnamm - W. Sommer "Die Lösungsmittel and Weichmachungsmittel" ("The Solvents and Plasticezers"), Stuttgart 1958q pages 589 and 735. Preferred are completely esterified di- and tri-carboxylic acids, as well as completely esterified polyvalent inorganic acids like di-n-butyl phthalate, di-2-ethylhexyl phthalate, diethyl sebacate, triethyl citrate or tricresyl phosphate.

In plastisols the plasticizers are most frequently used in quantities of 15 to 200 weight percent, preferably from 15 to 100 weight percent, always referred to the weight of the polymerizates.

As is known, for the manufacture of organosols one uses besides 10 to 50 weight percent, referred to the weight of the polymerizates, of plasticers, 10 to 50 weight percent, referred to the weight of the polymerizates, of nonvolatile insoluble or slightly soluble and swelling organic thinners. In addition one can use volatile thinners in any desired quantity, because due to their volatility they are no longer present in the finished products made from the organosols. Such an organosol may contain, for instance, esters that boil in a known manner as per German patent 0918,659, as plasticizers; petroleum extracts with a boiling point above 125° C./1 mm.Hg (abs.) as nonvolatile thinners, and hydrocarbons boiling within the range from 35° to 250° C. as volatile thinners.

The plastisols and organosols can be applied to tissues in the known manner, e.g. by brushing on, spraying or dipping, or they can be used for making cast objects and foam substances.

If desired, the polymerizates made according to the invention can also be processed thermoplastically in the known manner, i.e. using heat and pressure, e.g. by calendering, extruding, spray-casting or pressing, with or without plasticizers.

The viscosity data in the following examples were determined in each case by the Brookfield viscosimeter (see Bowles and coworkers in "Modern Plastics", Vol. 33, 1955, page 144) at 20 r.p.m. and the flow characteristics were determined in each case with the Severs extrusion rheometer (see e.g. Werner in "Modern Plastics", Vol. 34, 1957, page 137).

The transfer of plasticizers to absorptive supports is expressed by stating the width of a ring which is formed by the transfer of plasticizer around a circular spot with a diameter of 45 mm., of 1 g. paste on filter paper (Schleicher and Schull "589 Weissband") at 25° C. within 3 hours.

EXAMPLE 1 a. The Making of the Polymerizate Seed Latex

Into a mixing autoclave lined with refined steel we place 130 kg. water, 50 g. potassium persulfate and 3 kg. of a 10 weight-percent solution of the sodium salts of an isomer mixture, commercially available under the name "Isotridecanic acid", of aliphatic branched saturated monocarboxylic acid with 13 carbon atoms per molecule, where more than 50 percent of the carbon atoms are secondary carbon atoms in alpha position to the carboxyl group. (The isomer mixture mentioned above is made by oxidation of a mixture of branched, primary isotridecyl alcohols which have been obtained by oxosynthesis or hydroformyzation from purified tetra-propylene; it consists of more than 50 weight percent of tetra-methylbonaric acid and has the following characteristic data:
$D_{20} = 0.899$, $n_D^{20} = 1.4466$; neutralization number $= 260$; saponification index $= 260$; boiling range at 760 mm. Hg (abs.) $= 270°$ to $300°$ C.). After withdrawal of air from the autoclave, 20 kg. vinyl chloride are pumped into the autoclave. Then the contents of the autoclave, under stirring, is heated to 54° C. and is kept at this temperature under stirring until the end of the polymerization. After the pressure begins to fall (about 4 hours after the temperature of 54° C. is reached), 80 kg. vinyl chloride, and separately therefrom, 12 kg. of the 10 weight percent aqueous solution of the sodium salts of the isomer mixture of branched carboxylic acids described above are pumped in each within 13 hours in uniform streams.

b. Polymerization According the the Invention, Using the polymerization Seed Latex Into a mixing autoclave lined with refined steel we place 130 kg. water, 4 kg. of the polymerizate dispersion obtained as per a) as a polymerizate seed latex, 70 g. potassium persulfate and 2 kg. of the 10 weight percent aqueous solution of sodium salts of the isomer mixture of branched carboxylic acids with 13 carbon atoms per molecule, described under a). After evacuating the air from the autoclave, 20 kg. vinyl chloride are pumped in. The the contents of the autoclave are heated, under stirring, to 54° C. and kept at this temperature, under stirring, to the end of the polymerization. After the pressure begins to fall, 80 kg. vinyl chloride and separately therefrom 3 kg. of the 10 weight-percent aqueous solution of sodium salts of the isomer mixture of branched carboxylic acids with 13 carbon atoms per molecule described above under a) are pumped in each within 13 hours in uniform streams. After the polymerization is completed and the unconverted monomers have been blown off, the stable polymerizate dispersion is spray-dried.

A paste of 100 weight parts of the polymerizate obtained in this manner and of 65 weight parts di-2-ethylhexyl phthalate (DOP) has a viscosity of 2,500 cp./25° C. and largely Newtonian flow properties. Plasticizer yield: 5 mm. A film of such a paste which was mixed up with 2 weight percent, referred to the weight of the polymerizate, of commercial liquid stabilizer on a barium- and cadmium compound base, "Advastab" (registered trademark BS 206, is still not discolored after 50 minutes at 175° C.

The process described in example 1b is repeated with the difference that instead of 4 kg. polymerizate seed latex we use 2 kg. of the polymerizate seed latex obtained as per example 1a.

A paste of 100 weight parts of the polymerizate obtained in this manner and of 65 weight parts DOP has a viscosity of 4,500 cp./25° C. and largely Newtonian flow properties. Plasticizer yield: 4 mm. A film of a paste which is stabilized as described in example 1b is still undiscolored after 50 minutes at 175° C.

EXAMPLE 3

The work method described in example 1b is repeated with the difference that before the polymerization, instead of 2 kg. of the emulsifier solution, 3 kg. of the 10 weight percent aqueous solution of sodium salts of the isomer mixture of branched carboxylic acids with 13 carbon atoms per molecule as described in example 1a are introduced into the autoclave, and after the pressure begins to fall, instead of 3 kg. of this emulsifier solution, 12 kg. of said emulsifier solution are brought into the autoclave.

A paste of 100 weight parts of the polymerizate obtained in this manner and of 65 weight parts DOP has a viscosity of 3,200 cp/25° C., and Newtonian to pseudoplastic flow properties. Plasticizer yield: 4 mm. A film from such a past which is stabilized as described in example 1b is still undiscolored after 50 minutes at 175° C.

EXAMPLE 4

Into a stirring autoclave lined with refined steel we place 150 kg. water, 4 kg. of the polymerizate dispersion produced as per example 1a as polymerizate seed latex and 3 kg. of a 10 weight percent aqueous solution of an isomer mixture, commercially available under the name "Isodecanic acid", of aliphatic branched saturated monocarboxylic acids with 10 carbon atoms per molecule, where more than 50 percent of the carbon atoms are secondary carbon atoms in alpha position to the carboxyl group. (The isomer mixture mentioned above is made by the oxidation of a mixture of branched primary isodecyl alcohols which were obtained by oxosynthesis or hydroformyzation of purified tripropylene). After withdrawal of the air from the autoclave, 20 kg. vinyl chloride are pumped into the autoclave. Then the contents of the autoclave are heated, under stirring, to 54° C. and kept at this temperature, under stirring, to the end of the polymerization. After the pressure begins to fall, 80 kg. vinyl chloride and separately therefrom 12 kg. of the 10 weight percent aqueous solution of sodium salts of the isomer mixture of branched carboxylic acids with 10 carbon atoms per molecule described above are pumped in within 13 hours in uniform streams. After completion of the polymerization and blowing off of the unconverted monomers the stable polymerizate dispersion is spray-dried.

A past of 100 weight parts of the polymerizate obtained in this manner and 65 weight percent DOP has a viscosity of 3,400 cp/25° C. and largely Newtonian flow properties. Plasticizer yield: 4 mm. A film of such a past stabilized as described in example 1b is still undiscolored after 50 minutes at 175° C.

EXAMPLE 5

The work method described in example 4 is repeated with the difference that instead of the 10 weight percent aqueous solution of sodium salts of an isomer mixture of branched carboxylic acids with 10 carbon atoms per molecule we use a 10 weight percent aqueous solution of sodium salts of an isomer mixture, commercially available under the name "Isooctadecanic acid", of aliphatic branched saturated monocarboxylic acids with 18 carbon atoms per molecule, where more than 50 percent of the carbon atoms are secondary carbon atoms in alpha position to the carboxyl group. (The isomer mixture described above is made by oxidation of a mixture of branched primary octadecyl alcohols, which were obtained by oxosynthesis from branched olefines).

A past of 100 weight parts of the polymerizate obtained in this manner and 65 weight parts DOP has a viscosity of 6,000 cp/25° C. and Newtonian to pseudoplastic flop properties. Plasticizer yield: 3 mm. A film of such a paste which is stabilized as described in example 1b is still undiscolored after 50 minutes at 175° C.

Comparative test a)

The work method described in example 1b is repeated with the difference that the 2 kg. of the 10 weight percent aqueous emulsifier solution is not used before the polymerization. An undesirable coagulation of the polymerizate dispersion is observed.

Comparative test b)

The work method described in example 1b is repeated with the difference that before the polymerization one uses not 2 kg. but only 0.8 kg. of the 10 weight percent aqueous emulsifier solution. An undesirable coagulation of the polymerizate dispersion is observed.

The invention claimed is:

1. In a process for polymerizing and copolymerizing monomer comprising vinyl chloride in aqueous emulsion with a polymerizate seed latex and in the presence of a water-soluble salt of an aliphatic branched saturated monocarboxylic acid having at least eight carbon atoms per molecule as an emulsifier, in which seed latex said vinyl chloride and said emulsifier are present during at least a part of polymerization, the improvement comprising employing as at least about 50 percent of said emulsifier said aliphatic branched saturated monocarboxylic acid characterized by containing a $-CH_2-$ group in an alpha position to said acid's carboxyl group, in which total carbons of said acid range up to 21 carbon atoms per molecule, and in which said at least 50 percent comprises at least about 0.1 percent by total weight of the polymerizate in the polymerizate seed latex and the total quantity of said vinyl chloride to be polymerized.

2. The improvement according to claim 1, in which the emulsifier is a water-soluble salt of an aliphatic branched saturated monocarboxylic acid containing a $-CH_1-$ group in alpha position to the carboxyl group, with 10 to 18 carbon atoms per molecule.

3. The improvement according to claim 2, in which said polymerizate seed latex ranges from about 1 percent to about 10 percent by said total weight, in which said salts of said improvement are the salts of a member selected from the group consisting of an alkali metal hydroxide, an ammonium hydroxide, and an organic base, in which said monomer's proportion to water ranges from about 3:1 to about 1:2 and in which said polymerization occurs within a temperature range of about −20° C. to about 100° C., in which said vinyl chloride comprises about 80 percent by weight of total monomer, and in which a polymerization catalyst is employed in an amount ranging from about 0.01 percent to about 5 percent by said total weight.

4. The improvement according to claim 3, in which said catalyst ranges from about 0.02 to about 1 percent by said total weight, in which said polymerizate seed latex ranges from about 2 to 5 percent by said total weight, in which said monomer to water ranges from about 2:1 to about 1:1.5, in which said polymerization takes place within a temperature range from about 25° to about 70° C., in which said alkali metal hydroxide comprises sodium hydroxide, and in which said organic base comprises triethanolamine.

* * * * *